United States Patent
Gries et al.

[11] Patent Number: 6,139,043
[45] Date of Patent: Oct. 31, 2000

[54] ONE-PIECE PINTLE HITCH

[75] Inventors: Thomas A. Gries, Solon; Mark J. Saltzman, Moreland Hills, both of Ohio

[73] Assignee: Buyers Products Company, Inc., Mentor, Ohio

[21] Appl. No.: 09/095,198

[22] Filed: Jun. 10, 1998

Related U.S. Application Data

[60] Provisional application No. 60/077,028, Mar. 6, 1998.

[51] Int. Cl.$^7$ .................................................. B60D 1/01
[52] U.S. Cl. ........................ 280/504; 280/491.5; 280/511
[58] Field of Search .............................. 280/415.1, 416.1, 280/491.2, 491.5, 495, 504, 511; 29/897.2, 897.3, 897.35; 52/720.1, 740.2

[56] References Cited

U.S. PATENT DOCUMENTS

| | | | |
|---|---|---|---|
| 3,655,221 | 4/1972 | Warner | 280/490 |
| 3,698,739 | 10/1972 | Szymanski | 280/478 B |
| 3,807,768 | 4/1974 | Jones | 280/478 B |
| 3,963,266 | 6/1976 | Thelin | 280/504 |
| 4,229,934 | 10/1980 | Berky | 56/341 |
| 4,379,569 | 4/1983 | Koch | 280/415 |
| 4,568,098 | 2/1986 | Landry, Jr. | 280/415 |
| 4,758,015 | 7/1988 | Pixley | 280/504 |
| 4,792,153 | 12/1988 | Galdes | 280/478 B |
| 5,000,067 | 3/1991 | Kolbusz et al. | 81/436 |
| 5,033,764 | 7/1991 | Blacklaw | 280/508 |
| 5,106,114 | 4/1992 | Haupt | 280/416.1 |
| 5,314,202 | 5/1994 | Wilkins, Jr. | 280/511 |
| 5,332,250 | 7/1994 | Thorwall et al. | 280/507 |
| 5,421,612 | 6/1995 | Floe | 280/789 |
| 5,522,246 | 6/1996 | Simon | 72/260 |
| 5,560,630 | 10/1996 | Phares et al. | 280/416.1 |
| 5,620,218 | 4/1997 | Saltzman et al. | 280/117 |
| 5,695,204 | 12/1997 | Ford | 280/507 |
| 5,725,229 | 3/1998 | McWethy | 280/416.1 |
| 5,873,594 | 2/1999 | McCoy et al. | 280/491.1 |
| 5,941,550 | 8/1999 | Szczypski | 280/479.2 |
| 5,951,036 | 9/1999 | Sargent | 280/470 |
| 6,010,142 | 1/2000 | McCoy et al. | 280/490.1 |

FOREIGN PATENT DOCUMENTS 1491743 7/1989 Russian Federation.

OTHER PUBLICATIONS

Buyers Products Company, Catalog 197, 50th Anniversary Edition, pp. 136 through 140 and p. 145.
Draw–Tite 1998 Towing Systems–Total Solutions Catalog, p. 82.
Holland Specification Sheet—Swivel Type Pintle Hook—PH 215 Apr. 1981.

*Primary Examiner*—Brian Johnson
*Assistant Examiner*—Daniel Yeagley
*Attorney, Agent, or Firm*—Fay, Sharpe, Fagan, Minnich & McKee, LLP

[57] ABSTRACT

A one-piece pintle hitch is disclosed. The one-piece hitch utilizes an integral drawbar that may be engaged with a conventional receiver assembly such as installed along the underside of a vehicle. The one-piece pintle hitch avoids the use of prior art mounting plates that bolt to one another. Accordingly, the problems associated with threaded fasteners such as loosening, fracturing, and corrosion are eliminated. In addition, the one-piece pintle hitch utilizes a unique configuration along its bar portion that results in a significant reduction in weight and materials.

20 Claims, 10 Drawing Sheets

ONE-PIECE PINTLE HITCH

CROSS-REFERENCES TO RELATED APPLICATIONS

This application claims priority from a U.S. Provisional Application Serial No. 60/077,028, filed Mar. 6, 1998, entitled, "One-Piece Pintle Hitch."

BACKGROUND OF THE INVENTION

1. Field of the Invention

The present invention relates to a one-piece pintle hitch assembly. Conventional pintle hitches utilize a flange or mounting plate, usually integral with a hitch, that is bolted or otherwise secured to another mounting plate on a vehicle or towbar assembly. The present invention provides a one-piece hitch assembly that avoids the necessity of providing mounting plates. In addition, the pintle hitch assembly of the present invention provides an improved design that provides significant advantages over currently known pintle hitch assemblies.

2. Description of Related Art

Pintle hitch assemblies are known in the art. For example, U.S. Pat. Nos. 5,332,250 to Thornwall et al., 4,568,098 to Landrey Jr., and 5,106,114 to Haupt, all of which are herein incorporated by reference, disclose various pintle hitch assemblies. However, all of these pintle hitch assemblies utilize a mounting plate that must be attached to a corresponding mounting plate on the tow vehicle. Typically, the plates are bolted to one another to secure the pintle hitch to the vehicle. It is cumbersome and burdensome to align and bolt or otherwise attach the mounting plate of the pintle hitch assembly to a mounting plate that has been previously installed on the vehicle, and/or to remove and unbolt the hitch assembly from the vehicle mounting plate. And, as will be appreciated, it is often difficult to install a mounting plate to the vehicle since the plate must be securely affixed to the vehicle frame. Accordingly, there is a need for a pintle hitch assembly that avoids the use of mounting plates and the problems associated with such plates.

Moreover, there are significant safety concerns relating to the use of currently available pintle hitch assemblies that utilize mounting plates which bolt to one another. There are hazards associated with the use of bolts or threaded fasteners. Bolts are susceptible to being under torqued during installation which may lead to the bolt(s) becoming loose, and eventually separating from the assembly. Also, bolts may fracture or otherwise fail. And, it is well known that the threads and/or the corresponding threaded fastener, i.e., the nut, may become corroded and rust, thereby further increasing the difficulty of removing and re-attaching a pintle hitch to the tow vehicle. As a result, there is a need for a pintle hitch assembly that is not susceptible to these types of safety concerns.

Currently known pintle hitch assemblies are relatively heavy in view of the significant amount of metal used to form the bar portion of the assembly. The resulting weight increases the difficulty in mounting the pintle hitch assembly to the vehicle, and further increases costs associated with the manufacture of such assembly, primarily due to the increase in the amount of materials that are necessary. Accordingly, there is a need for an improved pintle hitch assembly, one which is lighter in weight and which is less expensive to manufacture.

SUMMARY OF THE INVENTION

The present invention achieves all of the foregoing objectives and provides, in a first aspect, a pintle hitch comprising a bar and a lower jaw that is integral with an end of the jaw. The pintle hitch further comprises an upper jaw hingedly attached to the bar end at which is disposed the lower jaw. The upper jaw is movable between a closed position and an open position. The other end of the bar, opposite the end at which is disposed the lower jaw, is adapted to engage a receiver assembly. The use of conventional mounting plates and associated threaded fasteners is entirely avoided.

In another aspect, the present invention provides a pintle hitch comprising a longitudinal bar member and a pintle hook and latch assembly disposed at an end of the bar. The bar defines two oppositely directed, narrowed regions along the side of the bar. The resulting pintle hitch is relatively light in weight and more economical to manufacture than conventional pintle hitches.

DESCRIPTION OF THE PREFERRED EMBODIMENTS

Figure 1:
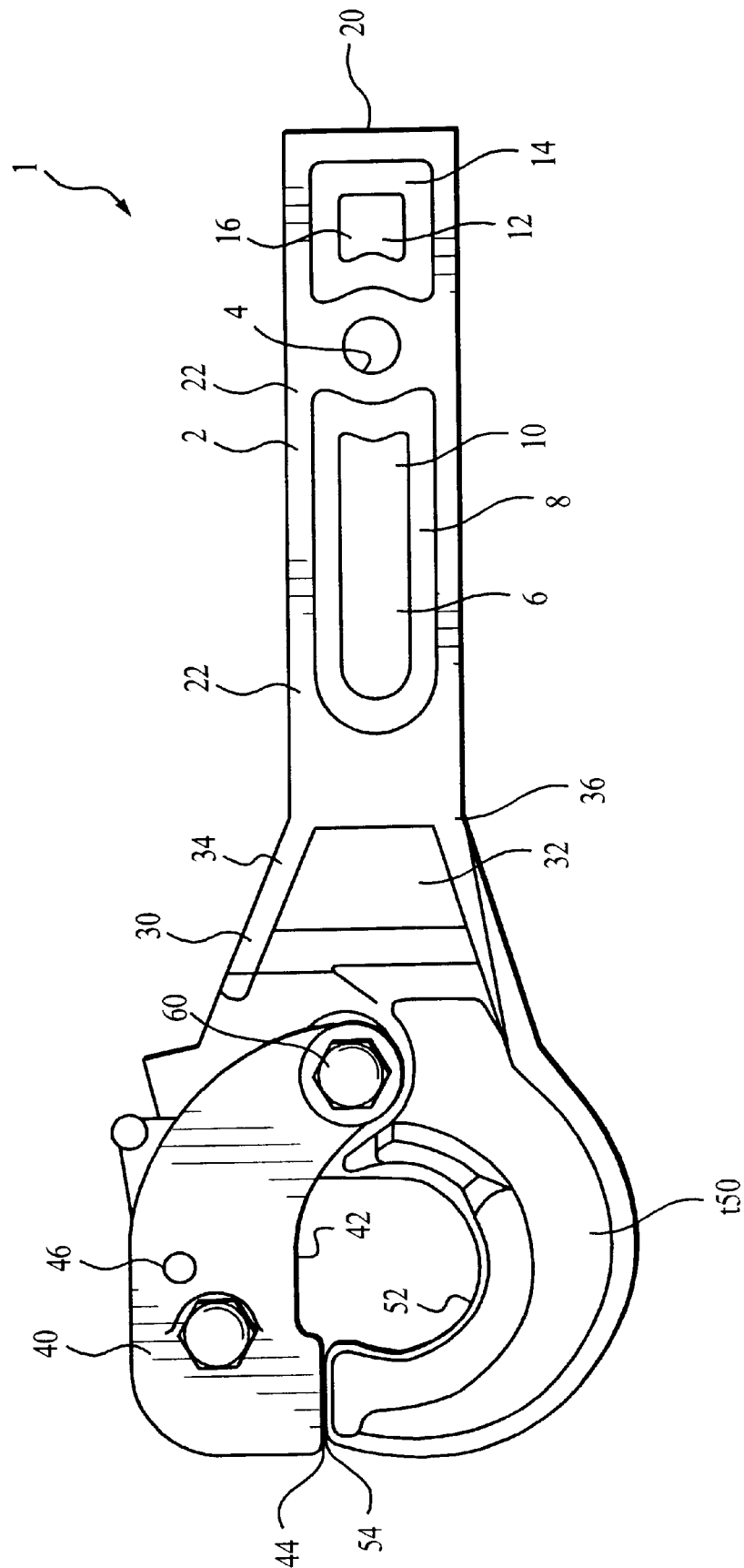
FIG. 1 is an elevational view of a first preferred embodiment of the pintle hitch assembly according to the present invention.

The present invention provides a one-piece pintle hitch assembly. Conventional pintle hitches utilize a flange or mounting plate, usually integral with the hitch, that is bolted or otherwise secured to another mounting plate on a vehicle or towbar assembly. The present invention provides a one-piece hitch assembly that avoids the necessity of providing mounting plates and the requisite mechanical fasteners such as threaded bolts and nuts. The pintle hitch assembly of the present invention includes a pintle hook that is formed or otherwise integrally attached at the end of a drawbar or other member. The drawbar may be engaged with a vehicle or conventional hitch assembly. Preferably, the drawbar and pintle hook assembly of the present invention may be received in a conventional square or round receiver tube. Typical receivers include Class II receivers available from Draw-Tite™. Accordingly, the term "receiver" or "receiver assembly" as used herein refers to these and similar assemblies that receive, and are engageable with, a drawbar.

In another aspect, the present invention provides a unique cross-sectional configuration utilized along one or more regions of the bar component of the preferred embodiment pintle hitch assembly. The unique configuration reduces the amount of material otherwise necessary, and thus, the weight of the assembly.

In yet another aspect, the present invention assembly provides a bar member in which the end of the bar, at which is located the pintle hitch, is offset from the longitudinal axis of the remaining portion of the bar. The present invention provides other preferred versions and configurations described herein.

Generally, the present invention relates to a one-piece pintle hitch that installs in conventional square or round receiver tubes. This one-piece hitch incorporates an upper hinged jaw or latch as generally referred to herein, a jaw locking device and a lower hook or jaw, and/or a combination ball lower jaw. The one-piece hitch preferably utilizes a bar having a square, rectangular, or circular cross section that is sized to fit common receivers. The device can be produced by welding, casting, or forging of iron, steel, etc. All of these aspects are described in greater detail below.

Referring to FIGS. 1–4, a first preferred embodiment pintle hitch assembly 1 according to the present invention is illustrated. It is to be understood that the referenced drawings are not to scale. In most applications, the bar portion of the pintle assembly will be significantly longer than shown. The pintle assembly 1 comprises a longitudinal bar 2, a lower hook or jaw 50, and a neck 30 extending between the hook 50 and the bar 2. The bar defines an aperture 4 proximate or near a bar end 20 as shown. The aperture 4 serves to receive a pin (not shown) that extends through the aperture 4 when the assembly 1 is engaged to the vehicle, i.e. a tow bar receiver typically installed along the rear underside of the vehicle. The bar 2 further defines a medial narrowed region 6 extending between the aperture 4 and the neck 30. Preferably, the bar 2 defines two narrowed regions 6, each on opposite sides of the bar 2. Each narrowed region 6 is defined by a recessed surface 10 and a transition surface 8 extending around the recessed surface 10. The bar 2 further defines a distal narrow regioned 12 generally located between the aperture 4 and the bar end 20. Preferably the bar 2 defines two narrowed regions 12, each on opposite sides of the bar 2. Each distal narrow regioned 12 defines a transition surface 14 that extends around a recessed surface 16. The narrowed regions 6 and 12 are described in greater detail in conjunction with FIG. 2. The bar 2 has a bar outer surface 22 as shown.

The neck 30 generally provides a transition region that connects the bar 2 and the hook 50. The neck 30 comprises an upper and a lower strengthening member 34 and 36, respectively, and an intermediate connecting portion 32 extending between the members 34 and 36.

The hook 50 generally comprises an arcuate member for engaging a conventional pintle eye component as known in the art. The arcuate member is generally C-shaped or in the shape of a semi-circle as shown in FIG. 1. The hook 50 includes an inner engagement surface 52 and a latch contact surface 54.

Referring to FIG. 1, the pintle assembly 1 further comprises an upper hinged jaw or latch 40 pivotally attached to a portion of the hook 50 or the neck 30. The latch 40 is preferably pivotally attached by use of a pivot member 60 which serves as an axis for pivoting of the latch 40. An aperture (not shown) is preferably defined in the latch 40 that serves to receive the pivot member 60. An aperture 62 is also preferably provided in a region of the hook 50 or neck 30 for receiving the pivot member 60. That member 60 preferably extends through or at least into both the aperture 62 in the hook 50 or the neck 30, and the aperture defined in the latch 40. The latch 40 further defines an aperture 46 along its mid-section. The aperture 46 is used in conjunction with a pin (not shown) that is used to provide a jaw locking arrangement. This is described in greater detail below. The latch 40 also includes an inner engagement surface 42 opposite the inner engagement surface 52 of the hook 50. Also defined along the outer end of the latch 40 is a hook contact surface 44 which opposes and contacts the latch contact surface 54 of the hook 50. As will be understood, the latch 40 preferably pivots about the pivot member 60 from a closed position, in which the contact surfaces 44 and 54 contact, or at least substantially so, each other; to an open position in which the latch 40 is pivoted upward thereby providing an opening between the surfaces 44 and 54, the opening being sufficient to receive a pintle eye component for subsequent engagement with the hook 50. As will be understood, once the latch 40 is in its closed position, it may be locked in that position by use of the jaw locking arrangement comprising a pin that is inserted in the aperture 46. Other locking arrangements may be utilized.

Figure 2:
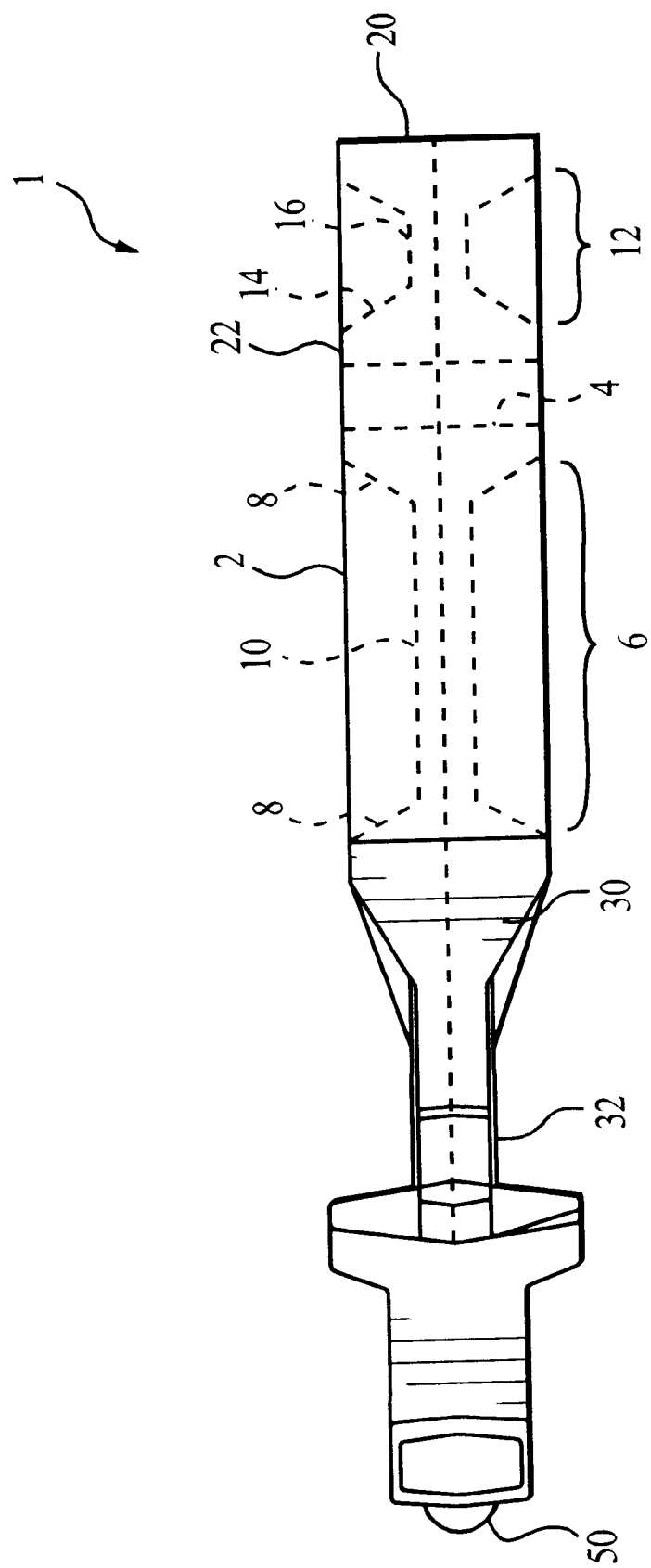
FIG. 2 is a top view of the first preferred embodiment pintle hitch assembly according to the present invention, the assembly having an upper latch component removed.

FIG. 2 is a top view of the first preferred embodiment pintle hitch assembly, illustrating in greater detail the preferred configuration of the narrowed regions 6 and 12. FIG. 2 illustrates the hitch assembly 1 having the upper latch 40 removed. It can be seen that each of two sides of the bar 2 defines a narrowed region 6 and another narrowed region 12. The regions 6 and 12 are separated by the aperture 4. The narrowed regions 6 on opposite sides of the bar 2 are preferably co-extensive with each other as shown in FIG. 2. Similarly, the narrowed regions 12 on opposite sides of the bar 2 are also coextensive with each other.

Figure 3:
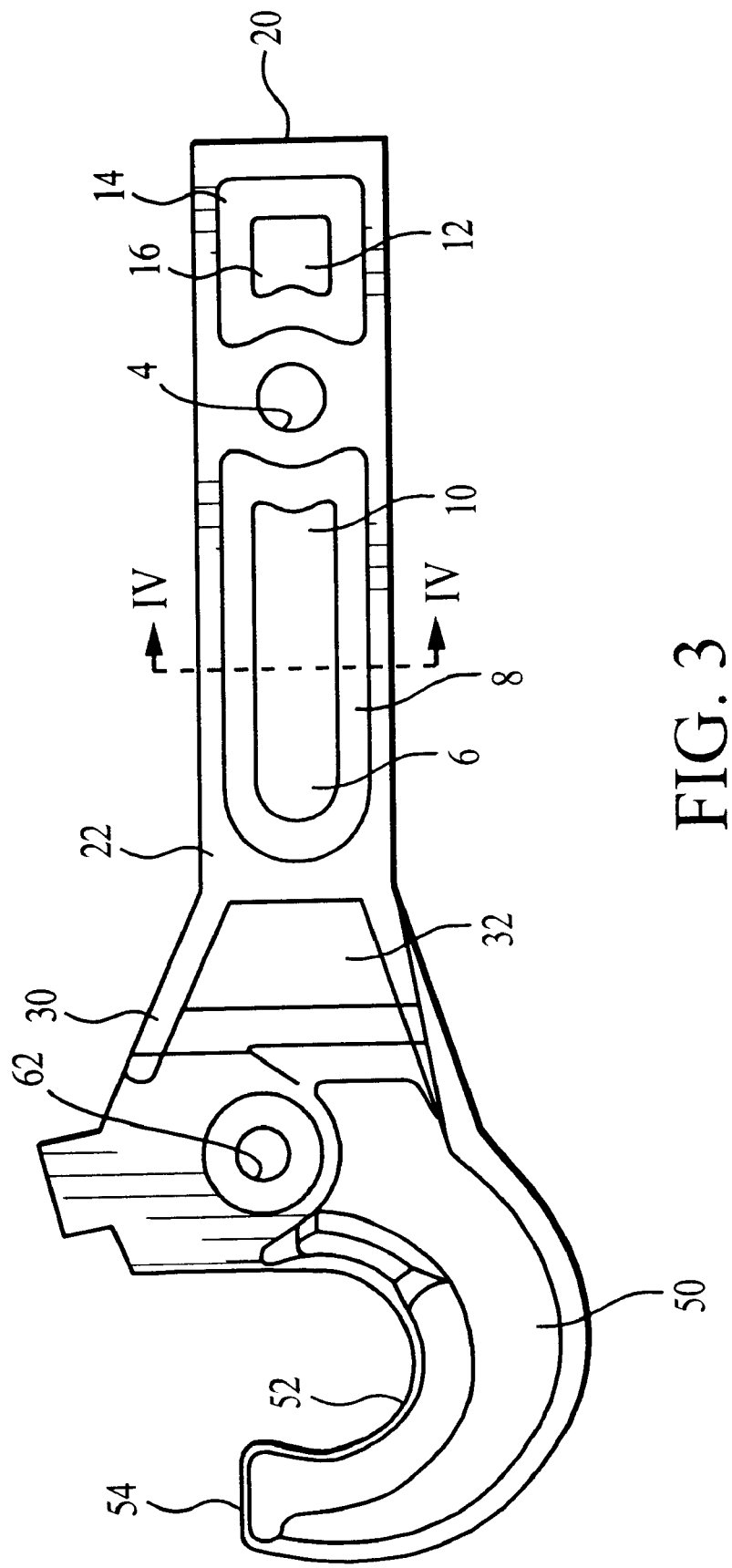
FIG. 3 is an elevational view of a partially disassembled first preferred embodiment pintle hitch assembly, the assembly having a latch component removed.
Figure 4:
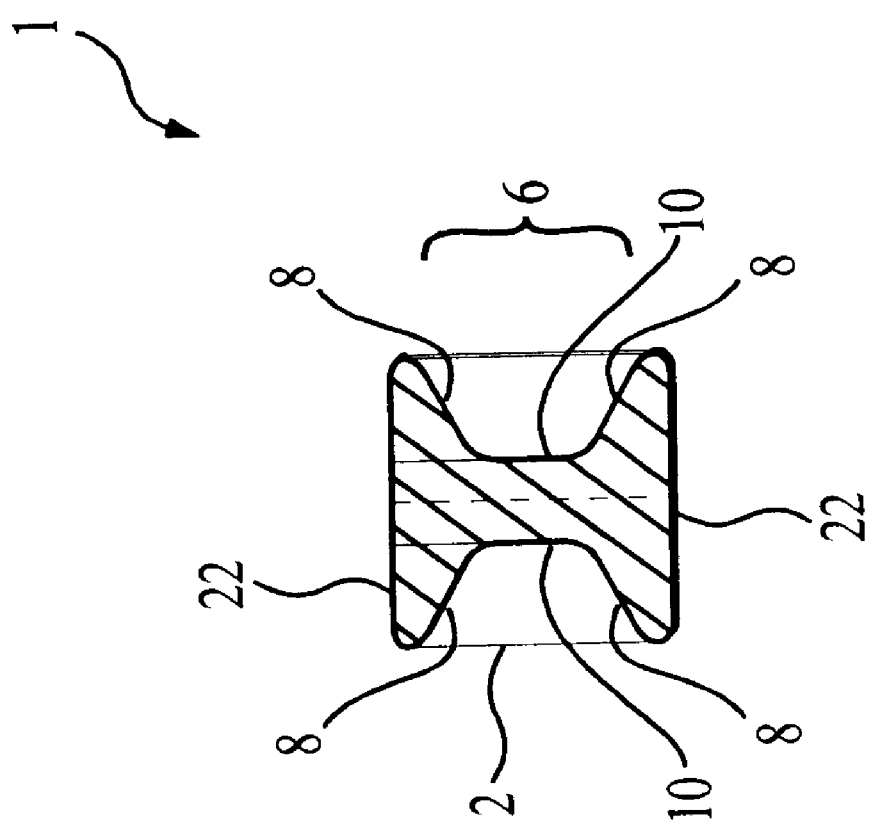
FIG. 4 is a cross-sectional view of the first preferred embodiment pintle hitch assembly shown in FIG. 3, the cross-section taken across line IV—IV in FIG. 3.

Referring to FIGS. 2 and 4, as noted, each narrowed region 6 includes a recessed surface 10 and a transition surface 8 that bounds the perimeter of the recessed surface 10 and which generally extends between the recessed surface 10 and the outer surface 22 of the bar 2. As will be understood, FIG. 4 is a cross-sectioned view of the bar 2 taken along line IV—IV in FIG. 3. Each of the recessed surfaces 10 are preferably parallel to each other and also parallel to the longitudinal axis of the bar 2. The transition surface 8 preferably extends at an angle other than 90° to the recessed surface 10 and the outer surface 22 of the bar 2. Most preferably, the angle between the recessed surface 10 and the transition surface 8 is from about 100° to about 135°. It is also preferred that the region of intersection between the recessed surface 10 and the transition surface 8 be rounded and smoothed to minimized the tendency for dirt and other debris to collect therein.

Referring further to FIGS. 2 and 4, as noted, each narrowed region 12 includes a recessed surface 16 and a transition surface 14 that bounds the perimeter of the recessed surface 16 and which generally extends between the recessed surface 16 and the outer surface 22 of the bar 2. Each of the recessed surfaces 16 is preferably parallel to each other and also parallel to the longitudinal axis of the bar 2. The transition surface 14 preferably extends at an angle other than 90° with respect to the recessed surface 16 and the outer surface 22 of the bar 2. Most preferably, the angle between the recessed surface 16 and the transition surface 14 is from about 100° to about 135°. As previously explained, it is also preferred that the region of intersection between the recessed surface 16 and the transition surface 14 be rounded and smoothed.

FIG. 3 illustrates the preferred embodiment pintle hitch assembly 1, partially disassembled, having the latch 40 and pivot member 60 removed. Aperture 62 is defined in an upper portion of the region extending between the hook 50 and the neck 30. The aperture 62 is sized to receive the pivot member 60 for securing the latch 40 to the remainder of the assembly 1 and for enabling the latch 40 to be pivoted about the member 60.

Figure 5:
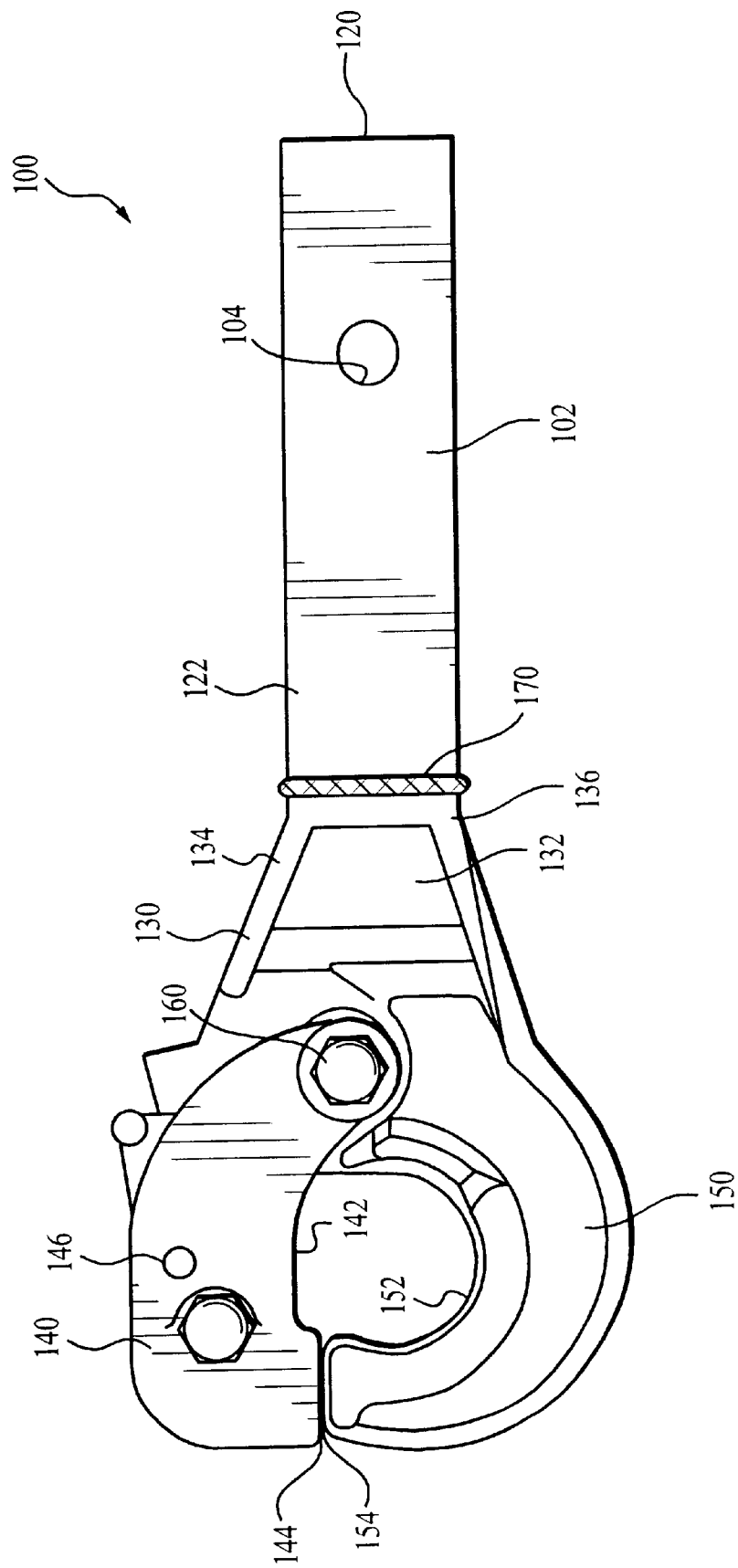
FIG. 5 is an elevational view of a second preferred embodiment pintle hitch assembly according to the present invention.

Referring to FIG. 5, a second preferred embodiment pintle hitch assembly 100 according to the present invention is illustrated. The pintle assembly 100 comprises a longitudinal bar 102, a hook 150, and a neck 130 extending between the hook 150 and the bar 102. The bar defines an aperture 104 proximate or near a bar end 120 as shown. The bar 102 has a bar surface 122 as shown.

The neck 130 generally provides a transition for connecting the portion between the bar 102 and the hook 150. The neck 130 comprises upper and lower strengthening members 134 and 136, respectively, and an intermediate connecting portion 132.

The hook 150, generally comprises an arcuate member for engaging a conventional pintle eye component as known in the art. The hook 150 includes an inner engagement surface 152 and a latch contact surface 154.

The pintle assembly 100 further comprises a latch 140 pivotally attached to a portion of the hook 150 or the neck 130 as shown. The latch 140 is preferably pivotally attached by use of a pivot member 160 which serves as the axis for pivoting of the latch 140. The latch 140 further defines an aperture 146 along its mid-section. As previously explained, the aperture 146 is used in conjunction with a pin (not shown) to lock or secure the latch in a closed position. The latch 140 also includes an inner engagement surface 142 opposite the inner engagement surface 152 of the hook 150. Also defined along the outer end of the latch 140 is a hook contact surface 144 which opposes and contacts the latch contact surface 154 of the hook 150.

It is to be understood that all of the preferred embodiment pintle hitch assemblies described herein may be formed in a variety of ways, including welding. If welding is employed, a pintle hook and latch sub-assembly may be welded to a bar along a ridge 170 as shown in FIG. 5. It is also to be understood that the present invention one-piece pintle hitch assemblies may, in some applications, not utilize one or more narrowed regions, such as the previously described narrowed regions 6 and 12. The second preferred embodiment 100 is illustrated as being devoid of any narrowed regions along its bar 102.

Figure 6:
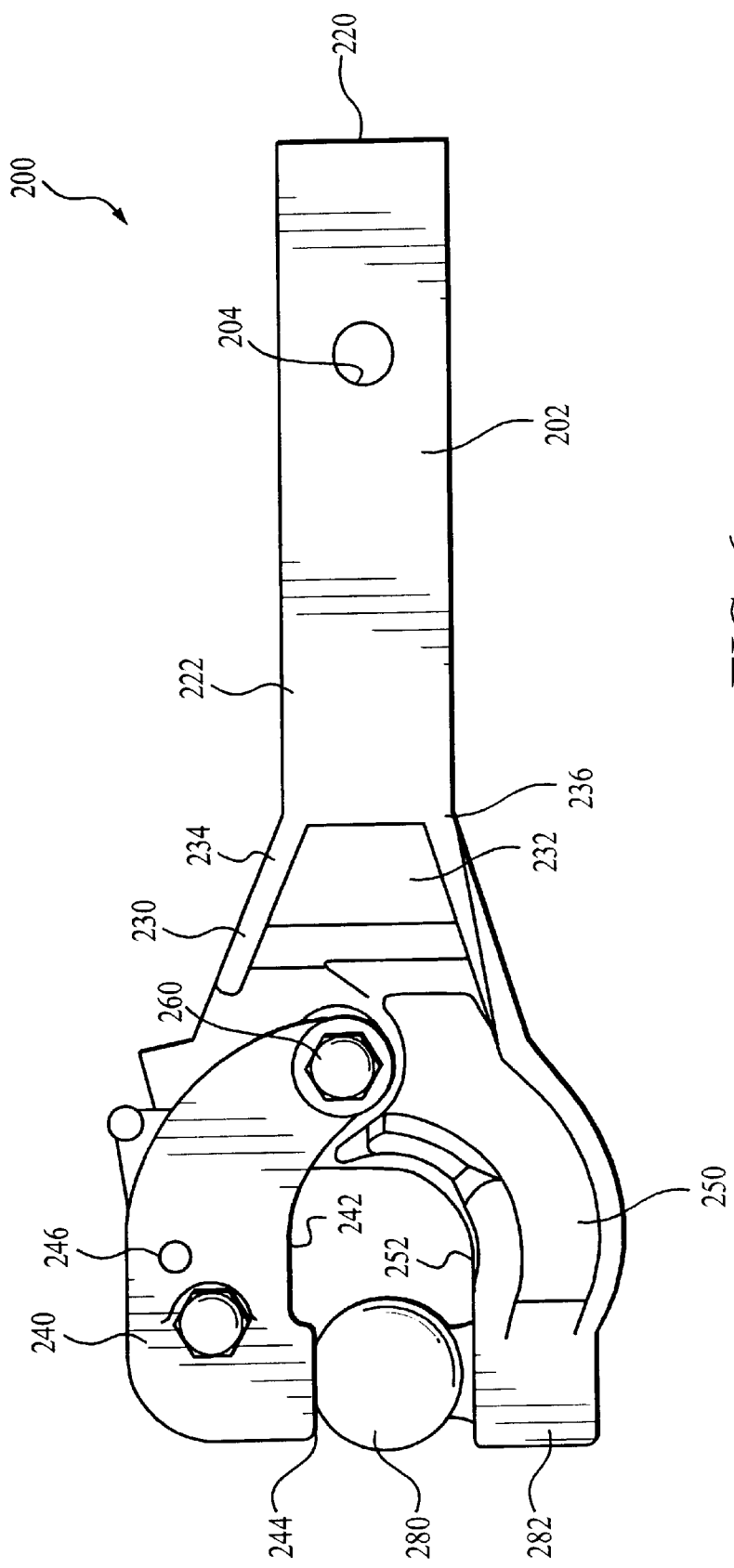
FIG. 6 is an elevational view of a third preferred embodiment pintle hitch assembly according to the present invention.

Referring to FIG. 6, a third preferred embodiment pintle hitch assembly 200 according to the present invention is illustrated. The pintle hitch assembly 200 comprises a longitudinal bar 202, a hook 250 and a neck 230 extending between the hook 250 and the bar 202. The bar defines an aperture 204 proximate or near a bar end 220 as shown. The bar 202 has a bar surface 222 and a bar end 220 as shown.

The neck 230 generally provides a transition for connecting the portion between the bar 202 and the hook 250. The neck 230 comprises upper and lower strengthening members 234 and 236, respectively, and an intermediate connecting portion 232.

This preferred embodiment 200 utilizes a combination ball lower jaw. Specifically, the hook 250 generally comprises a base 282 disposed at a distal end of the hook 250. Projecting upward from the base 282 is a ball 280. The ball 280 is preferably sized to be engageably received in a conventional socket housing. The hook 250 further includes an inner engagement surface 252.

The pintle hook assembly 200 further comprises a latch 240 pivotally attached to the portion of hook 250 or neck 230. The latch 240 is preferably pivotally attached by use of a pivot member 260 which serves as the axis for pivoting of the latch 240. The latch 240 further defines an aperture 246 along its mid-section. The latch 240 also includes an inner engagement surface 242 opposite the inner engagement surface 252 of the hook 250. Also defined along the outer end of the latch 240 is an inner contact surface 244 which opposes and contacts, or at least substantially so, the ball 280 of the hook 250.

Figure 7:
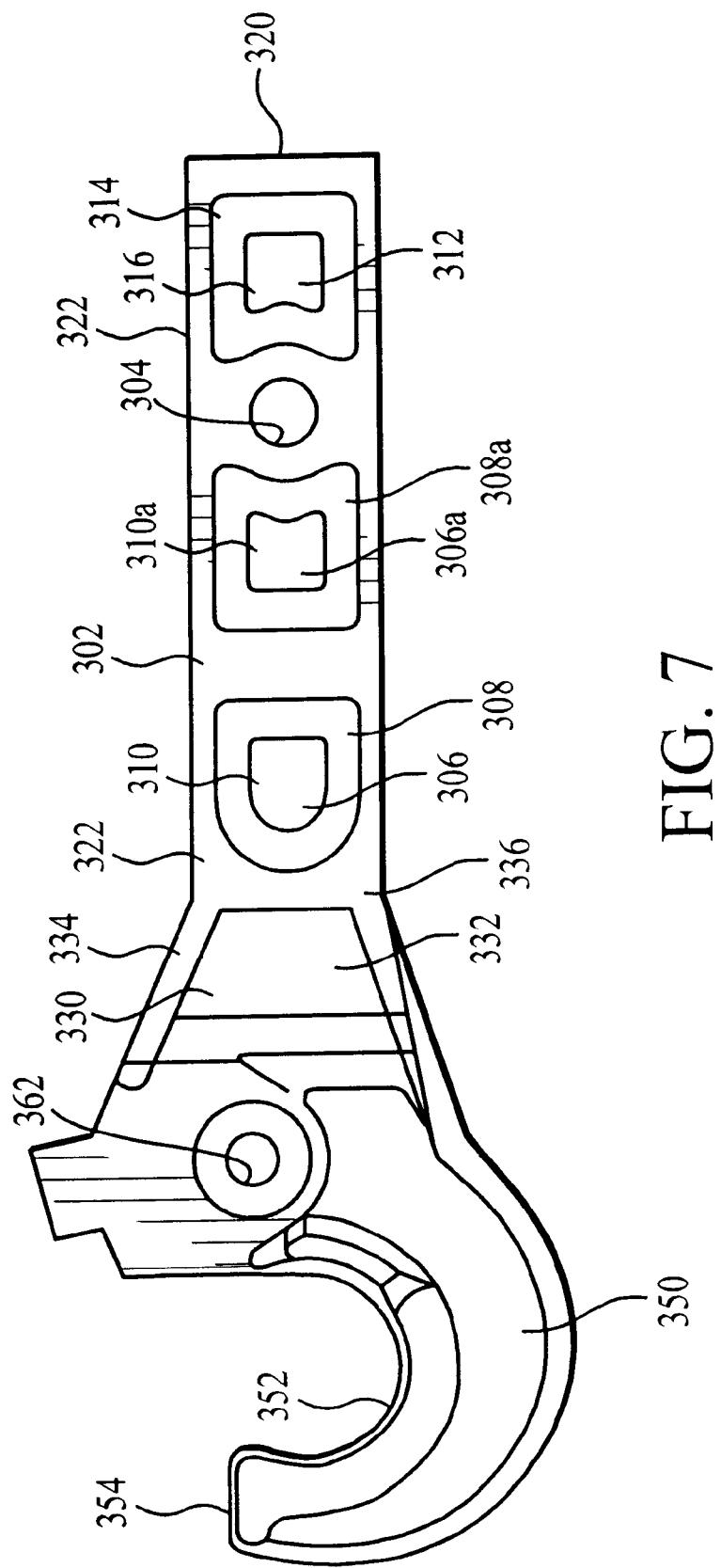
FIG. 7 is an elevational view of a fourth preferred embodiment pintle hitch assembly according to the present invention in which the latch component has been removed.
Figure 8:
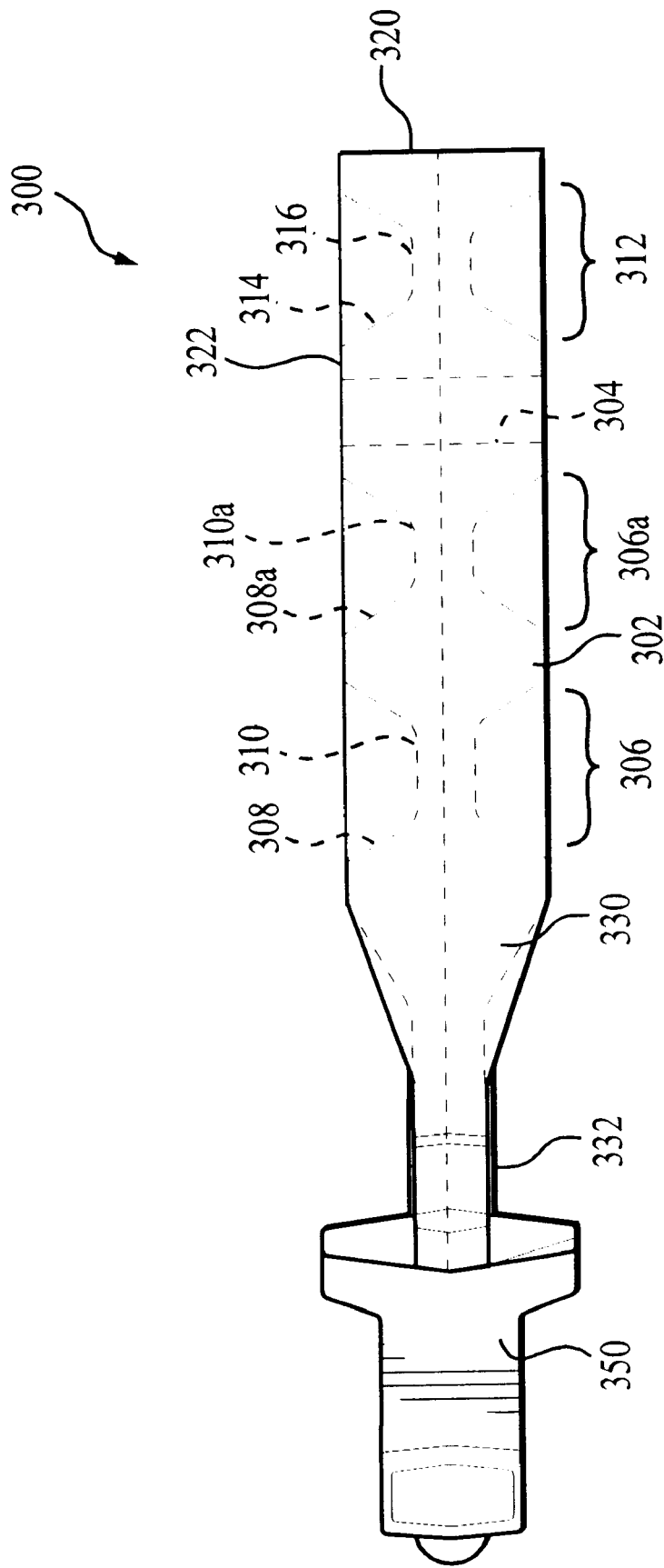
FIG. 8 is a top view of the fourth preferred embodiment pintle hitch assembly illustrated in FIG. 7.

Referring to FIGS. 7 and 8, a fourth preferred embodiment pintle hitch assembly 300 according to the present invention is illustrated. The pintle hitch assembly 300 comprises a longitudinal bar 302, a hook 350, and a neck 330 extending between the hook 350 and the bar 302. The bar defines an aperture 304 proximate or near a bar end 320 as shown. The bar 302 further defines a first and second medial narrowed region 306 and 306a extending between the aperture 304 and the neck 330. Preferably, the narrowed regions 306 and 306a are defined on two oppositely directed faces of the bar 302. Each narrowed region 306 and 306a is defined by a recessed surface 310 or 310a and a transition surface 308 or 308a extending around the recessed surface 310 or 310a. The bar 302 further defines a distal narrowed regioned 312 generally located between the aperture 304 and the bar end 320. The distal narrowed regioned 312 defines a transition surface 314 that extends around a recessed surface 316. The bar 302 has a bar surface 322 as shown.

The neck 330 generally provides a transition region for connecting the portion between the bar 302 and the hook 350. The neck 330 comprises an upper and a lower strengthening member 334 and 336, respectively, and an intermediate connecting portion 332.

The hook 350 generally comprises an arcuate member for engaging a conventional pintle eye component as known in the art. The hook 350 includes an inner engagement surface 352 and a latch contact surface 354.

The pintle assembly 300 further comprises a latch (not shown) pivotally attached to the region of hook 350 or neck 330. Although the latch is not shown in FIGS. 7 and 8, it will be understood that the latch resembles and generally corresponds to any of the previously described latches 40, 140, and 240. The latch is preferably pivotally attached by use of a pivot member (not shown) which serves as the axis for pivoting of the latch. An aperture 362 is defined in an upper portion of the region between the hook 350 and the neck 330. The aperture 362 is sized to receive the pivot member.

The distal narrowed region 312 generally corresponds to the previously described distal narrowed region 12 in the preferred embodiment pintle hitch assembly 1. Each of the medial narrowed regions 306 and 306a generally correspond to the previously described medial narrowed region 6 in the preferred embodiment pintle hitch assembly 1.

Figure 9:
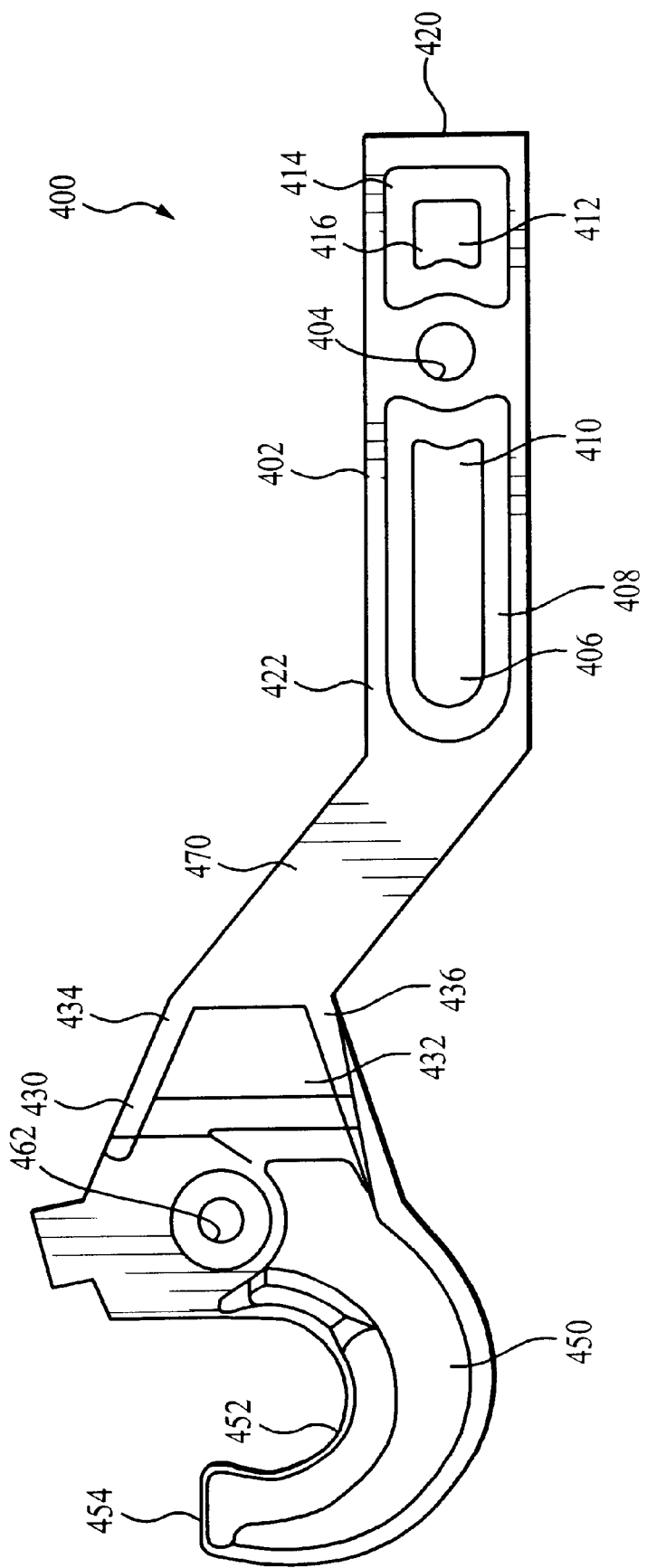
FIG. 9 is an elevational view of a fifth preferred embodiment pintle hitch assembly according to the present invention.

Referring to FIG. 9, a fifth preferred embodiment pintle hitch assembly 400 according to the present invention is illustrated. This embodiment finds particular use in applications in which the tow vehicle is at a lower elevation than the trailer or pintle eye. The pintle hitch assembly 400 comprises a longitudinal bar 402, a hook 450, a neck 430, and an upward extension portion 470 extending between the hook 450 and neck 430, and the bar 402. The bar defines an aperture 404 proximate or near a bar end 420 as shown. The bar 402 further defines a medial narrowed region 406 extending between the aperture 404 and the extension portion 470. The narrowed region 406 is defined by a recessed surface 410 and a transition surface 408 extending around the recessed surface 410. The bar 402 further defines a distal narrowed region 412 generally located between the aperture 404 and the bar end 420. The distal narrowed region 412 defines a transition surface 414 that extends around a recessed surface 416. The bar 402 has a bar outer surface 422 as shown.

The neck 430 generally provides a transition for connecting the portion between the bar 402 and the hook 450. The neck 430 comprises upper and lower strengthening members 434 and 436, respectively, and an intermediate connecting portion 432 extending therebetween The hook 450 generally comprises an arcuate member for engaging a conventional pintle eye component as known in the art. The hook 450 includes an inner engagement surface 452 and a latch contact surface 454.

The pintle assembly 400 further comprises a latch (not shown) pivotally attached to a portion of hook 450 or neck 430. Although the latch is not shown in FIG. 9, it will be understood that the latch resembles and generally corresponds to any of the previously described latches 40,140, and 240. The latch is preferably pivotally attached by use of a pivot member (not shown) that extends through an aperture 462 which serves as the axis of pivoting of the latch.

Figure 10:
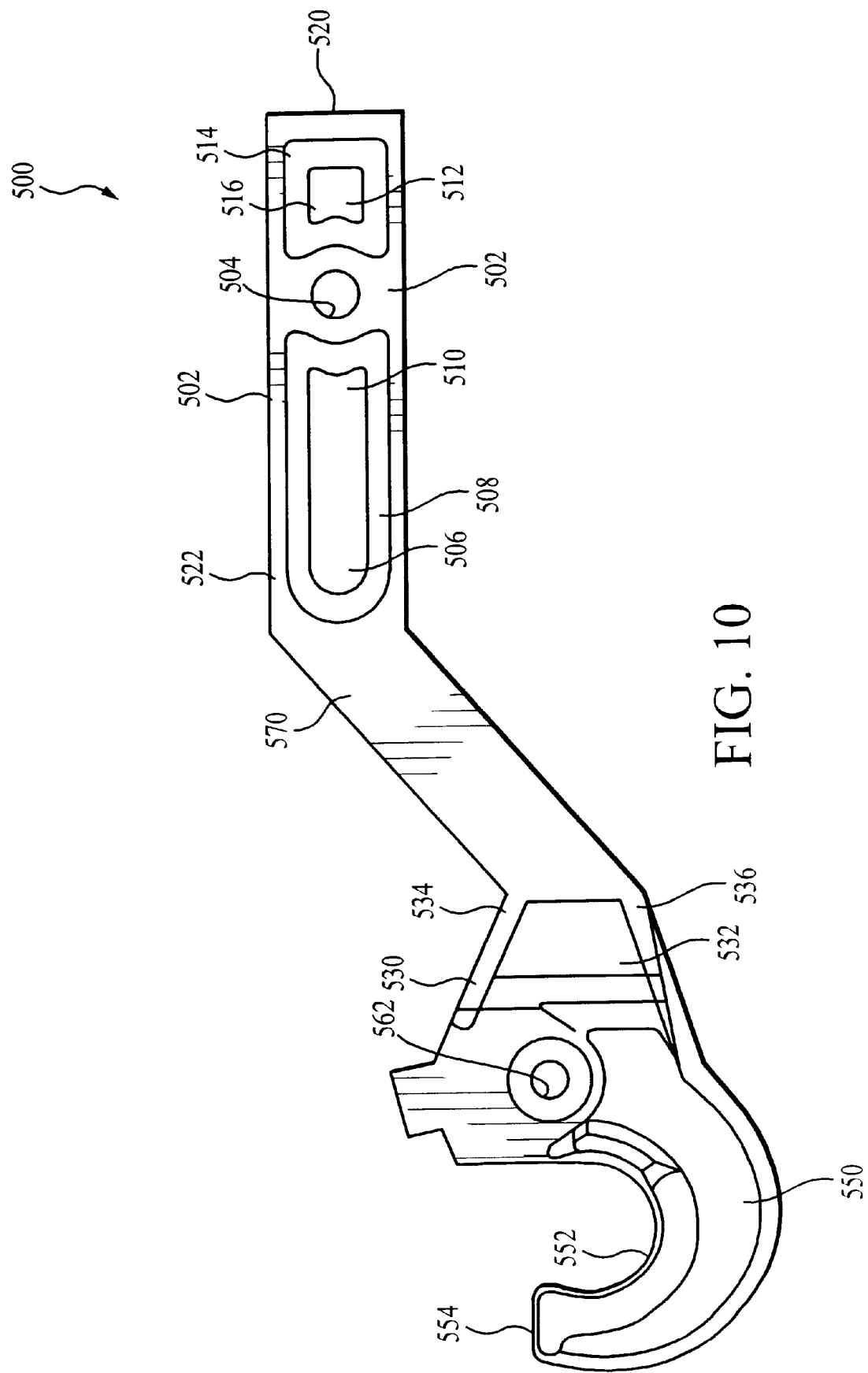
FIG. 10 is an elevational view of a sixth preferred embodiment pintle hitch assembly according to the present invention.

Referring to FIG. 10, a sixth preferred embodiment pintle hitch assembly 500 according to the present invention is illustrated. This embodiment finds particular use in applications in which the tow vehicle is at a higher elevation than the trailer or pintle eye. The pintle hitch assembly 500 comprises a longitudinal bar 502, a hook 550, a neck 530, and a downward extension portion 570 extending between the hook 550 and the bar 502. The bar defines an aperture 504 proximate or near a bar end 520 as shown. The bar 502 further defines a medial narrowed region 506 extending between the aperture 504 and the portion 570. The narrowed region 506 is defined by a recessed surface 510 and a transition surface 508 extending around the recessed surface 510. The bar 502 further defines a distal narrowed regioned 512 generally located between the aperture 504 and the bar end 520. The distal narrowed region 512 defines a transition surface 514 that extends around a recessed surface 516. The bar 502 has a bar outer surface 522 as shown.

The neck 530 generally provides a transition for connecting the portion between the downward extension portion 570 and the hook 550. The neck 530 comprises an upper and a lower strengthening member 534 and 536, respectively, and an intermediate connecting portion 532.

The hook 550, generally comprises an arcuate member for engaging a conventional pintle eye component as known in the art. The hook 550 includes an inner engagement surface 552 and a latch contact surface 554.

The pintle assembly 500 further comprises a latch (not shown) pivotally attached to the portion of hook 550 or neck 530. The latch is preferably pivotally attached by use of a pivot member (not shown) that extends through an aperture 562 which serves as the axis of pivoting of the latch. Although the latch is not shown in FIG. 10, it will be understood that the latch resembles and generally corresponds to any of the previously described latches 40, 140, and 240.

It is also to be understood that one or more features of each of the previously described preferred embodiments 1, 100, 200, 300, 400, and 500, may be combined with one or more other features of the noted preferred embodiments.

The various preferred embodiment pintle hitch assemblies replace conventional two-piece pintle hook or combination hook, and pintle mount adapters. These preferred embodiments offer savings in weight, installation, time and cost.

Specifically, the unique configuration of the narrowed regions described herein, when provided in the bar portion of the present invention hitch assembly, significantly reduces the weight of the final assembly without sacrificing strength, safety, or reliability. The preferred embodiment hitch assemblies described herein are about 35% lighter in weight as compared to competing two-piece hitch assemblies that do not utilize narrowed portions, and that employ mounting plates. As previously noted, the narrowed regions result in significant savings in material and time and labor otherwise necessary to carry out the requisite machining and forming. Another important feature of the present invention one-piece hitch assembly is that it is more compact and easier to stow than a corresponding hitch assembly utilizing mounting plates and threaded fasteners.

The invention has been described with reference to the preferred embodiments. Obviously, modifications and alterations will occur to others upon a reading and understanding the preceding detailed description. It is intended that the invention be construed as including all such modifications and alterations in so far as they come within the scope of the appended claims or the equivalents thereof.

In the claims:

1. A pintle hitch comprising
    a bar having a non-cylindrical configuration and further having a distal end and a proximal end opposite from said distal end;
    a lower jaw integrally formed with and nonseparable from said distal end of said bar, and extending therefrom by a neck having an upper and lower strengthening member and intermediate connecting portion;
    an upper jaw hingedly attached to said distal end of said bar, said upper jaw being movable from a closed position in which a portion of said upper jaw contacts a portion of said lower jaw, to an open position in which said upper jaw is spaced from said lower jaw; wherein said proximal end of said bar has a rectangular cross section and is adapted to engage a receiver assembly.

2. The pintle hitch of claim 1, wherein said distal end of said bar defines a first aperture, said upper jaw defines a second aperture, and said upper jaw is hingedly attached with respect to said bar such that said first aperture defined in said bar is aligned, or substantially so, with said second aperture defined in said upper jaw, and said pintle hitch further comprises a pin extending into said first aperture and said second aperture thereby hingedly attaching said upper jaw to said bar.

3. The pintle hitch of claim 1 wherein said lower jaw is C-shaped.

4. The pintle hitch of claim 1 wherein said bar further has a first side extending between said distal end and said proximal end, and a second side opposite from said first side and also extending between said distal end and said proximal end, wherein said bar defines a first narrowed region along said first side of said bar and a second narrowed region along said second side of said bar.

5. The pintle hitch of claim 1 wherein said bar defines an aperture proximate said proximal end of said bar, said aperture adapted to receive a removable pin for securing said pintle hitch to a tow vehicle.

6. The pintle hitch of claim 1 wherein said lower jaw comprises a ball member extending from a distal end of said lower jaw.

7. The pintle hitch of claim 1 wherein said lower jaw and said upper jaw are offset from a longitudinal axis of said bar.

8. The pintle hitch of claim 7 wherein said bar includes an offset portion proximate said distal end of said bar, such that said distal end of said bar, and said upper jaw and said lower jaw, are displaced from the longitudinal axis of said bar.

9. A pintle hitch comprising:

a longitudinal bar member having a non-cylindrical configuration and further having a distal end, a proximal end, a first side extending between said distal end and said proximal end, and a second side opposite from said first side and also extending between said distal end and said proximal end; and a pintle hook and latch assembly disposed at said distal end of said bar member, said pintle hook being integral with and nonseparable from said distal end of said bar member by a neck having an upper and lower strengthening member and intermediate connecting portion, said latch being pivotally movable with respect to said pintle hook;

wherein said bar defines a first narrowed region along said first side of said bar and a second narrowed region along said second side of said bar, thereby imparting a non-circular cross section to said bar along said first and second narrowed regions, and said proximal end of said bar is adapted to engage a receiver assembly.

10. The pintle hitch of claim 9 wherein said pintle hook is C-shaped.

11. The pintle hitch of claim 9 wherein said bar member defines an aperture proximate said proximal end of said bar member, said aperture adapted to receive a pin.

12. The pintle hitch of claim 9 wherein said pintle hook comprises a ball member extending from a distal end of said pintle hook.

13. The pintle hitch of claim 9 wherein said pintle hook and latch assembly is offset from a longitudinal axis of said bar.

14. The pintle hitch of claim 13 wherein said bar member includes an offset portion proximate said distal end of said bar, such that said distal end of said bar member, and said pintle and latch assembly, are displaced from the longitudinal axis of said bar.

15. The pintle hitch of claim 9 wherein said bar defines a third narrowed region along said first side of said bar and a fourth narrowed region along said second side of said bar.

16. The pintle hitch of claim 15 wherein said bar defines a fifth narrowed region along said first side of said bar and a sixth narrowed region along said second side of said bar.

17. A pintle hitch assembly comprising:

a longitudinal bar member having a non-cylindrical configuration and further having a distal end, a proximal end, a first side extending between the distal end and the proximal end, and a second side opposite from said first side and extending between the distal end and the proximal end, said bar defining an aperture extending through said bar proximate said proximal end and further defining a first narrowed region along said first side of said bar and a second narrowed region along said second side of said bar;

a lower jaw integrally formed with said bar and permanently disposed at said distal end of said bar by a neck having an upper and lower strengthening member and intermediate connecting portion, said lower jaw defining an aperture extending through said lower jaw;

an upper jaw hingedly attached to said lower jaw, said upper jaw defining an aperture extending through said upper jaw, said upper jaw being positioned with respect to said lower jaw such that said aperture defined in said upper jaw is aligned with said aperture defined in said lower jaw;

a pivot member disposed in said aperture defined in said lower jaw and said aperture defined in said upper jaw, wherein said pivot member serves to provide said hinged attachment between said upper jaw and said lower jaw;

wherein said proximal end of said bar is adapted to engage a hitch receiver assembly.

18. The pintle hitch assembly of claim 17 wherein said bar member includes an offset portion extending between said lower jaw and a region of said bar member between said distal end of said bar member and said proximal end of said bar member, said offset portion extending away from the longitudinal axis of said bar member such that said upper jaw and said lower jaw are displaced from the longitudinal axis of said bar member.

19. The pintle hitch assembly of claim 17 wherein said lower jaw comprises a ball member extending from a distal end of said lower jaw.

20. The pintle hitch assembly of claim 17 wherein said bar member further defining a third narrowed region along said first side of said bar and extending between said aperture defined in said bar and said proximal end of said bar, and further defining a fourth narrowed region along said second side of said bar and extending between said aperture defined in said bar and said proximal end of said bar.

* * * * *

UNITED STATES PATENT AND TRADEMARK OFFICE
CERTIFICATE OF CORRECTION

PATENT NO. : 6,139,043        Page 1 of 1
DATED : October 31, 2000
INVENTOR(S) : Thomas A. Gries et al.

It is certified that error appears in the above-identified patent and that said Letters Patent is hereby corrected as shown below:

<u>Figure 1,</u>
Replace "t50" with -- 50 --.

Signed and Sealed this

Eighteenth Day of December, 2001

Attest:

Attesting Officer

JAMES E. ROGAN
Director of the United States Patent and Trademark Office